United States Patent [19]

Allinquant et al.

[11] 4,089,512
[45] May 16, 1978

[54] PNEUMATIC SPRINGS AND OTHER TELESCOPIC SYSTEMS

[76] Inventors: Fernand Michel Allinquant, 53, Avenue Le Notre; Jacques Gabriel Allinquant, 12, Avenue Arouet, both of 92-Sceaux, France

[21] Appl. No.: 689,603

[22] Filed: May 24, 1976

[30] Foreign Application Priority Data

Dec. 15, 1975 France .............................. 75 38295

[51] Int. Cl.² ............................................ F16F 9/18
[52] U.S. Cl. ...................................... 267/65 R; 188/282
[58] Field of Search .................. 267/65 R, 64 R, 124, 267/126, 129; 188/282, 317, 320, 322

[56] References Cited

U.S. PATENT DOCUMENTS

| 3,207,498 | 9/1965 | Wustenhagen et al. | 267/65 R |
| 3,874,486 | 4/1973 | Katsumori et al. | 188/282 |
| 3,927,871 | 12/1975 | de Bann | 267/65 R |

FOREIGN PATENT DOCUMENTS 2,355,254  5/1974  Germany .......................... 267/65 R

*Primary Examiner*—James B. Marbert
*Attorney, Agent, or Firm*—Staas & Halsey

[57] ABSTRACT

A telescopic system formed of a relatively slidable plunger rod and cylinder is operated as a pneumatic spring equipped with an end-stroke electrically-actuated indicator. The plunger rod is fitted with a damping piston which is slidably mounted thereon between two stops secured thereto and used as valve members for partially obturating a groove formed on the piston face and communicating with an axial passage through the piston. The cylinder bottom and the slidable piston constitute the two associated contacts of an electric switch and are respectively connected to the terminals of an electric circuit energizing an indicator.

14 Claims, 8 Drawing Figures

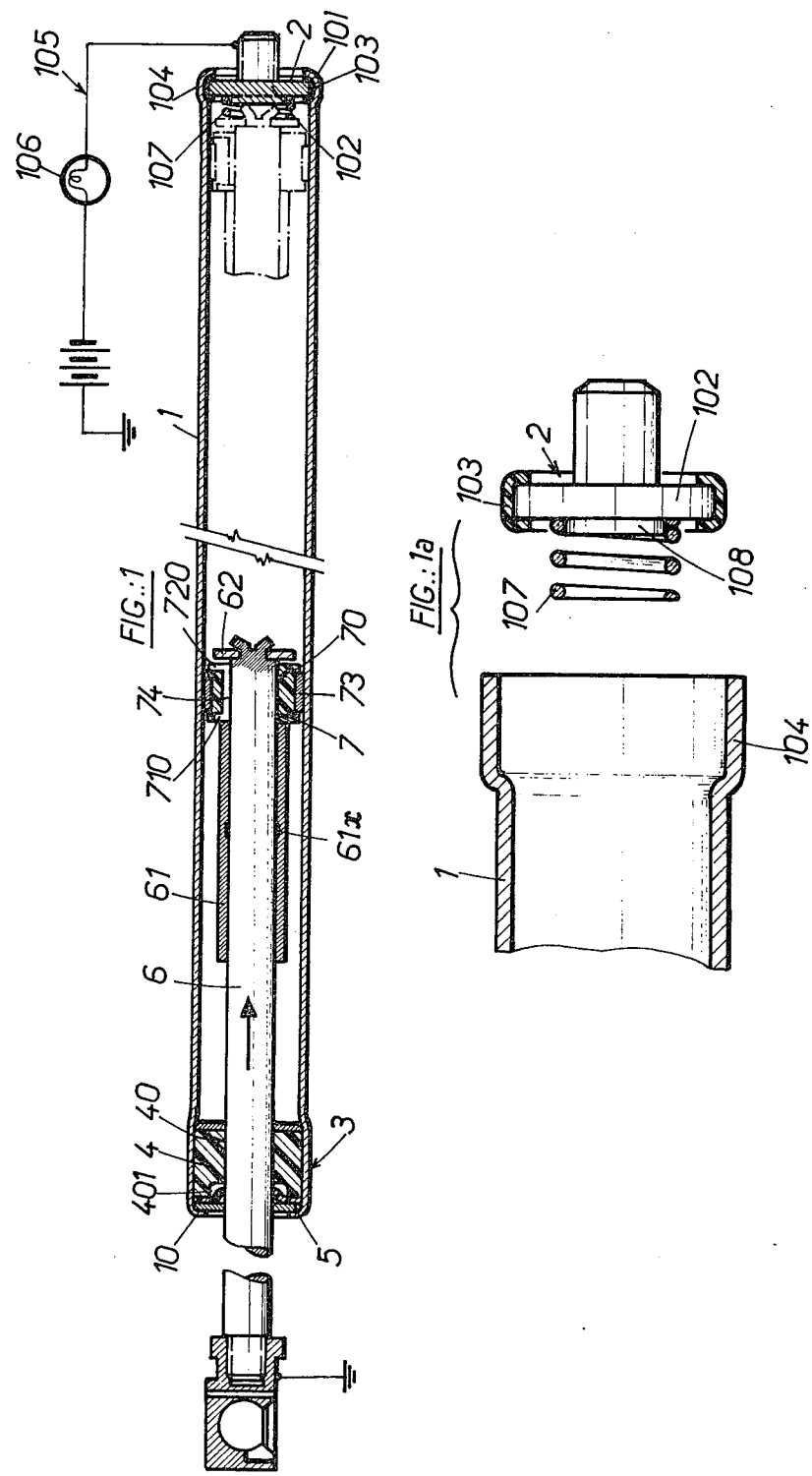

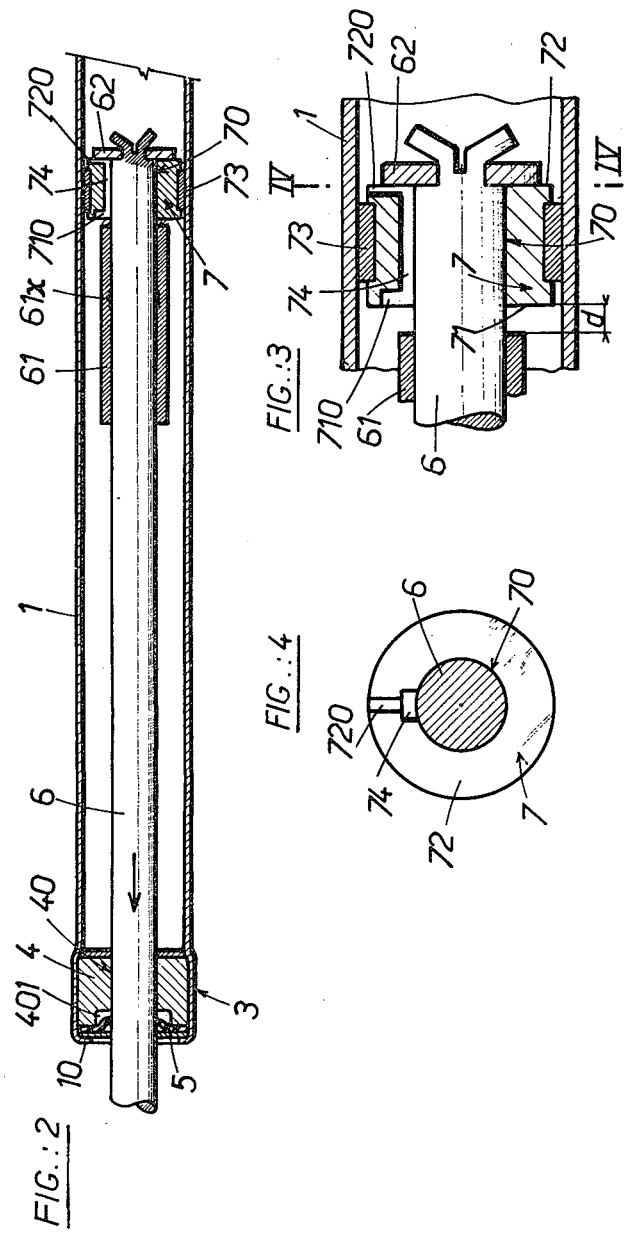

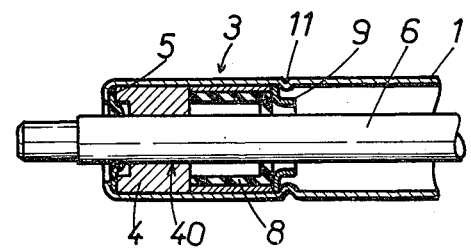
FIG.:5
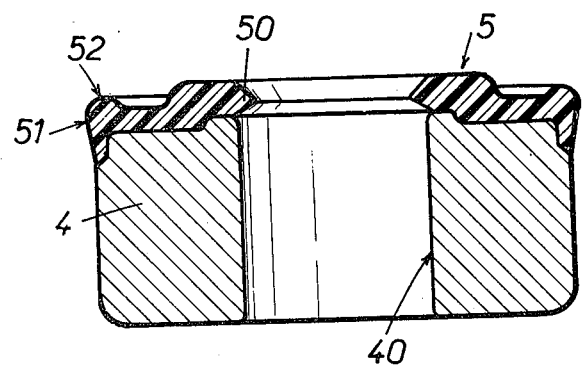
FIG.:6
FIG.:7
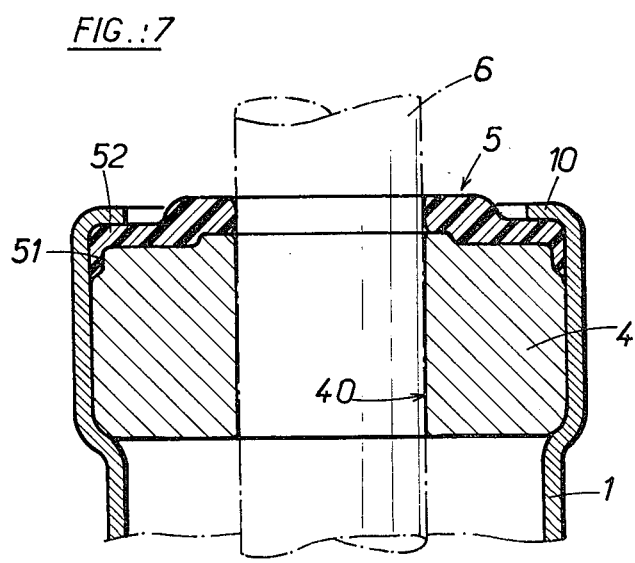

PNEUMATIC SPRINGS AND OTHER TELESCOPIC SYSTEMS

Pneumatic springs have been proposed already which comprise a plunger rod entering sealingly in a cylinder with pressurized gas, and having a guiding damping piston which divides the cylinder into two chambers communicating with each other by means of an axial passage through the piston.

Damped pneumatic springs of the kind set forth can be used for opening and closing vehicles or machines bonnets, actuating doors, controlling seats or desks level, etc..

It is an object of the present invention to provide a spring with a predetermined damping characteristic and advantageously of different value according to the moving direction of the plunger rod.

For this purpose, the piston is slidable on the plunger rod between two stops united to the rod, one of which at least acts also as a closing member for partially closing a groove provided in the corresponding end face of the piston and communicating with the axial passage provided in said piston.

According to a preferred embodiment, both end faces of the piston are formed with a groove provided for being partially closed by the corresponding stop of the rod, one of these grooves (preferably that which is carved in the end face of the piston regarding the side opposite to the plunger rod) being substantially less deep than the other, so that the cross section available for the gas flow from one cylinder chamber to the other is substantially lower in a moving direction of the plunger rod than in the other direction.

The invention has also for its object to improve the spring tightness at the point where the plunger rod enters the cylinder by means of a hydraulic seal and a mechanical seal of special form.

According to an other object of the present invention there is provided an electrical contact device suitable especially for detecting the end position of a telescopic system which may be a pneumatic spring such as above set forth.

According to the present invention, there is provided an electrical switch comprising a cylinder with a closed bottom end, and in which a piston is slidably mounted, this bottom and piston constituting respectively the fixed and the movable contact of the switch, being electrically insulated one from the other and connected to the terminals of an electric circuit which is either closed or broken if the piston after having moved over its whole stroke engages the bottom of the cylinder or is spaced apart from it. Such a contact could be done merely through direct engagement of the bottom by the piston; nevertheless for manufacturing tolerances and blows dampering grounds, it is better to use between them an electrically conducting flexible member such a spring acting as a resilient abutment, which may be fixed at will on the piston or on the bottom.

According to an embodiment of the present invention, the cylinder is made of a conducting material and is permanently in electrical contact with the piston, whereas the bottom, also of a conducting material is fixed to said cylinder by means of a crown of insulating material, which besides may be acting as sealing gasket for the telescopic system. Alternatively, the insulation between bottom and piston could be located over the bottom, i.e., between the bottom and the cylinder, or provided by the cylinder itself, which then would be made of insulating material, at least at its end portion adjacent to the bottom.

The above discussed electrical circuit including the switch according to the present invention, comprises preferably a signal generating member, which accordingly will be actuated by the closing of the switch, in other words the piston having achieved its stroke, the circuit acting accordingly as a end position detector of the telescopic system.

The invention will now be further described, by way of example only, with reference to the accompanying drawings in which:

FIG. 1 is an axial cross-sectional view of a telescopic system in accordance with the invention, acting as a pneumatic spring with plunger rod and piston movable in a cylinder (the rod and the piston being shown when moving inwardly in the cylinder), and as electrical switch able to detect the inside end position of the telescopic system (the electrical circuit being schematically shown);

FIG. 1a is a cross-sectionnal partial axial view of the end part of the so mounted device, but before mounting and fastening of the bottom on the cylinder;

FIG. 2 is a view similar to FIG. 1, but showing the plunger rod and the piston when moving outwardly of the cylinder;

FIG. 3 is an enlarged cross-sectionnal axial view of the spring portion located in the piston zone;

FIG. 4 is a transversal cross-sectionnal view of the piston and plunger rod assembly, along line IV—IV of FIG. 3;

FIG. 5 is an axial cross-sectionnal view of a pneumatic spring end portion, in according to a modification of the invention;

FIG. 6 is an enlarged cross-sectionnal view of a cylinder closing plug, fitted with a mechanical sealing joint in accordance with the invention; and FIG. 7 is a view similar to FIG. 6, showing the plug and the joint mounted in the cylinder end.

On FIGS. 1 to 4, numeral 1 indicates a cylinder sealingly closed at an end by a bottom 2, and at the other end by a closing assembly 3. This assembly comprises on one hand a plug 4 sealingly forced in the cylinder end and setted in that cylinder by folding back an end edge 10 of the cylinder, and on the other hand a mechanical seal 5 provided with a lip, engaging with one face the external face of the plug. The plug 4 is formed with a bore 40 entered sealingly by a plunger rod 6. The plug 4 is made of "Nylon, Teflon, Rilsan" (registered trademarks) or other strong polymeric insulating substance with a low friction coefficient allowing easy sliding of steel rod 6.

The thus designed impervious cylinder, which is also made of steel is filled up with a pressurized gas, preferably an inert gas such as nitrogen for preventing all busting risk. The pressure in the cylinder may be of several ten $kg/cm^3$ or so.

During the plunger rod entering the cylinder, there arise an additional pressure applied on the free end of the rod, urging the rod outside the cylinder as soon as the rod is free. It is so provided a pneumatic spring of which two essential elements are on one hand the plunger rod 6, and on the other hand the impervious cylinder 1 containing the pressurized gas.

In the area of its free end, the plunger rod 6 is fitted with a piston 7 comprising a thick washer in Nylon or other strong and insulating polymeric material, having two annular end faces 71, 72 (FIG. 3) and a central bore 70 coaxial to the plunger rod, and through which the latter is threaded. The piston 7 comprises a sealing and friction ring 73 at its periphery, allowing the piston to guide the plunger rod and to subdivide cylinder 1 into two chambers on either side of the piston.

Piston 7 is also used as a damping element for the pneumatic spring in service. To this end, as it is shown in enlarged scale on FIGS. 3 and 4, it comprises an axial passage 74 opening on both end faces 71, 72 and intercommunicating the two chambers of the cylinder. The axial passage of this embodiment as shown is achieved by a groove 74 carved in the piston and beginning from the bore 70.

At least one, but preferably each, of the annular end faces 71 and 72 of piston 7 is provided with a radial groove extending outwardly from the axial groove 74. In the illustrated embodiment, such radial grooves 710 and 720 are formed on the piston end faces 71 and 72 respectively, both radial grooves 710 and 720 extending, as stated from axial groove 74. As shown in FIG. 3, these radial grooves are of very different depth, groove 710 in the end face 71 regarding to plunger rod 6 being the deeper.

Piston 7 is axially slidable on plunger rod 6 between two stops 61, 62 fast therewith and which are shown as formed each by a part different from, but locked to, the plunger rod. Stop 61 is formed e.g. by a sleeve welded or set (in 61x) on plunger rod 6, and being used simultaneously as a strut for limiting the outward stroke of the rod. Stop 62 may be made of a metallic washer fixed at the end of the rod. The axial distance between stops 61 and 62 is greater than the axial length of piston 7, so that piston 7 is allowed to move by inertia on a distance "d" (see FIG. 3) of several millimetres or so between these two stops.

When in use, as the plunger rod 6 enters cylinder 1 in the direction as shown by the arrow on FIG. 1, the gas is urged to flow from the right to the left of the piston (on the figure). Piston 7 is made loose from stop 62 and engages stop 61.

In this configuration, the opening of axial passage 74 on piston face 72 is free, whereas way out of this axial passage which is determined by radial groove 710 cut in piston face 71 is partially closed by stop 61. However, as this groove 710 is rather deep, an important area allowing the gas to flow from one chamber to the other through the piston is determined, so that this flow is not or little resisted and the balance of pressure between the two chambers is easily obtained. The damping effect of piston 7 is then weak or worthless.

This configuration corresponds to the case when the plunger rod 6 is urged to enter the cylinder with growing pressure of the gas. The only effort to exert is the compression force corresponding to the cross-section area of the rod and the pressure of the gas.

On the contrary, when the plunger rod 6 is going out of cylinder 1 in the direction of the arrow on FIG. 2, piston 6 becomes loose from stop 61 and engages stop 62. The opening of axial passage 74, now located on piston face 71 is free, whereas the way out of this passage, formed by radial groove 720 cut in piston face 72 is partially closed by stop 62. As this radial groove is of little depth, it determines for the flow of gas a reduced area, so that escaping of gas is strongly resisted. The loosening of the spring, due to the force of the pressurized gas on the cross-section area of the rod is then damped.

According to the deepness of radial grooves 710 and 720, the free area section allowing gas to flow is not the same in either direction, and consequently the damping effect of the rod entering or going out of the cylinder. A previous adjustment means is provided in this way in view of subsequent use of the pneumatic spring.

In order to keep on the working particulars level of the device, it is necessary to provide an efficient sealing at the entrance of the plunger rod 6 into the cylinder filled up with pressurized gas.

According to a feature of the invention as shown on FIGS. 1, 2 and 5, the sealing is improved by using a hydraulic sealing gasket fitted on closing assembly 3 and comprising a housing filled up with oil, surrounding the plunger rod and interposed between the mechanical sealing gasket 5 and the inside space of the cylinder.

This housing may for example be delimited merely by a local enlargement 401 (see FIGS. 1 and 2) of bore 40 of plug 4. This disposition can be used preferably with a pneumatic spring vertical or sloping when the closing assembly 3 is placed at the lower part of the cylinder.

According to a modification shown in FIG. 5, the oil filled housing can be formed by a bag 8 of elastomeric material, interposed between the inner face of plug 4 and a cage engaging fold 11 of cylinder 1. Interposition of a liquid between the pressurized gas and the outside causes the mechanical gasket 5 with lip, which is subjected to a hydraulic pressure, to provide a better seal and to be worn less quickly.

FIG. 6 shows an advantageous way of realizing and mounting a sealing gasket 5 with a lip for a pneumatic spring, the service position of which is always near the vertical, with the rod going out by the lower end. In these conditions, it is of no use to provide a housing, such as housing 401, carved in plug 4 since it is sufficient to put in the cylinder, on the rod side, several cubic centimeters of oil which will gather after closing of the spring, and so provide the desired lubrication of the gasket.

The gasket 5 can then be made of an elastomeric material moulded washer, adhered on one face, preferably by curing, on the outer face of plug 4.

On its internal periphery, this washer is formed with an edge 50 projecting radially with respect to the bore 40 of the plug, providing a sealing lip arranged to resiliently engage plunger rod 6. The adhering of the washer is useful for securing the position of the sealing lip and preventing it to be carry away by the moving rod.

Besides, at its external periphery, the washer 5 comprises a portion 51 projecting radially with respect to the external periphery of the plug, and forming standing seal between cylinder 1 and plug 4, during the forced entering of the plug in the cylinder. Likewise, on its external face, washer 5 is formed with a bead 52 projecting axially, which during the setting for closing the cylinder, is crushed by the folded edge 10, so as to complete the external tightness, as shown in FIG. 7.

According to the present invention, such a pneumatic spring is arranged to form an electrical switch allowing the remote signalling of the operation, and of the position, extended or retracted, of the pneumatic spring.

As shown on FIGS. 1 and 1a, the closing bottom 2 of cylinder 1 is made of a metallic disc 102, the periphery of which is covered with an insulating plastic crown 103 made of a synthetic rubber mixture adhered and cured on disc 102; it is used to ensure the tightness of this cylinder end and the insulation of the metallic part 102 with respect to cylinder 1 during forced inserting in the outflaring end 104 of cylinder 1. A folded flange 101 is provided for keeping in place bottom 2.

It appears that with this construction, cylinder 1 is electrically insulated from rod 6 and bottom 2.

If such a telescopic system is inserted in an electrical circuit 105, the circuit is open so long as the end of rod 6 has not engaged the metallic bottom 102, and no electric current can flow to light lamp 106 or other signalling device, indicating the retracted position of the telescopic system.

In view of mounting conveniences, a resilient member such as a helicoidal spring 107 is provided, being tightened on a centering boss 108, provided on the metallic bottom 102: by this resilient member the desired contact is secured on the end of the compression stroke of the telescopic system.

In the appended claims, the word "piston" is used to designate the end portion of the slidable assembly, either the piston 7 itself, or the plunger rod 6 end, or the added stop 62.

We claim:

1. A telescopic type pneumatic spring comprising:
a gastight cylinder filled with pressure gas;
a plunger rod sealingly telescoping into said cylinder and presenting an inner end portion inside the same;
two axially-spaced stops fast with and protruding radially from said inner end portion of said plunger rod;
a piston slidably fitted on said inner end portion intermediate said axially-spaced stops for restricted axial displacement relative to said plunger rod limited by abutment of said piston against one or the other of said two stops, said piston subdividing said cylinder into two chambers and presenting;
two opposite annular end faces respectively bounding said cylinder chambers; and
passage measn formed through said piston and leading to openings at said end faces thereof for intercommunicating said cylinder chambers, at least one of said openings being partially obstructed by the adjacent one of said two axially-spaced stops when said piston abuts against it.

2. A pneumatic spring as claimed in claim 1, wherein said partially obstructable opening comprises a recess formed in the corresponding piston end face and extending from said through passage means.

3. A pneumatic spring as claimed in claim 3, wherein said through pasasge means comprises a generally axial passage, and said recess comprises a generally radial groove extending further outward than the adjacent one of said radially protruding stops.

4. A pneumatic spring as claimed in claim 2, wherein each of said openings is partially obstructable and comprises a recess formed in the respective piston end face and extending from said through passage means.

5. A pneumatic spring as claimed in claim 4, wherein said through passage means comprises a generally axial passage, and said recess comprise generally radial grooves extending further outward than the respective adjacent radially protruding stops.

6. A pneumatic spring as claimed in claim 5, wherein one of said radial grooves is larger than the other, whereby the throttling effect due to partial obstruction of a radial groove by the adjacent stop when said piston abuts against it, is less in the case of said larger groove than in the case of the other.

7. A pneumatic spring as claimed in claim 6, wherein said one radial groove is deeper than said other radial groove.

8. A pneumatic spring as claimed in claim 6, wherein said larger radial groove is formed in the one of said piston end faces which is directed towards the plunger rod entry into said cylinder, whereby said throttling effect is less upon retraction of said plunger rod into said cylinder than upon extension thereof out of said cylinder.

9. A pneumatic spring as claimed in claim 1, wherein said piston has an open-end axial through bore which is coaxial with said plunger rod and through which said inner end portion is threaded to allow slidable fit of said piston thereto, and said through passage means comprises a groove formed in the wall of said through bore whereby said groove is inwardly bounded by the surface of said inner end portion of said plunger rod.

10. A pneumatic spring as claimed in claim 9, wherein said groove extends generally parallel to the axis of said through bore along a generatrix of said wall thereof.

11. A pneumatic spring as claimed in claim 10, wherein said partially obstructable opening comprises a recess-formed in the corresponding piston end face and extending from said axial groove, said recess comprising a generally radial groove extending further outward than the adjacent one of said radially protruding stops.

12. A pneumatic spring as claimed in claim 11, wherein each of said piston end faces presents a generally radial groove extending further outward than the adjacent one of said radially protruding stops.

13. A pneumatic spring as claimed in claim 1, wherein said two axially-spaced stops comprise mechanical parts separate and distinct from said plunger rod but secured thereto.

14. A pneumatic spring as claimed in claim 13, wherein the mechanical part which is secured to said plunger rod adjacent the one of said piston end faces which is directed towards the plunger rod entry into said cylinder, comprises an axially-extending sleeve surrounding said plunger rod, whereby said sleeve limits the extension stroke of said plunger rod out of said cylinder by abutment of the end of said sleeve which is remote from said piston.

* * * * *

UNITED STATES PATENT AND TRADEMARK OFFICE
CERTIFICATE OF CORRECTION

PATENT NO. : 4,089,512
DATED : May 16, 1978
INVENTOR(S) : Fernand Michel Allinquant et al It is certified that error appears in the above-identified patent and that said Letters Patent are hereby corrected as shown below:

Heading [30] Foreign Application Priority Data should include -- May 23, 1975  France 75 16138 --;

Column 2, line 22, 28, 30, 33, 36, "sectionnal" should be -- sectional --;

Column 4, line 48, "carry" should be -- carried --;

Column 5, line 41, "measn" should be -- means --;

Column 5, line 52, "3" should be -- 2 --.

Signed and Sealed this

Twentieth Day of March 1979

[SEAL]

Attest:

RUTH C. MASON
*Attesting Officer*

DONALD W. BANNER
*Commissioner of Patents and Trademarks*